United States Patent
Farley et al.

(10) Patent No.: US 9,708,980 B2
(45) Date of Patent: Jul. 18, 2017

(54) APPARATUS AND SYSTEM FOR COMPRESSOR CLEARANCE CONTROL

(71) Applicant: General Electric Company, Schenectady, NY (US)

(72) Inventors: Nicholas Robert Farley, Greenville, SC (US); Joel Russell Cloninger, II, Anderson, SC (US); John Fitzgerald Lawler, Dallas, GA (US)

(73) Assignee: General Electric Company, Schenectady, NY (US)

( * ) Notice: Subject to any disclaimer, the term of this patent is extended or adjusted under 35 U.S.C. 154(b) by 566 days.

(21) Appl. No.: 14/296,846

(22) Filed: Jun. 5, 2014

(65) Prior Publication Data

US 2015/0354454 A1 Dec. 10, 2015

(51) Int. Cl.
| | | |
|---|---|---|
| *F01D 11/24* | (2006.01) | |
| *F01D 21/00* | (2006.01) | |
| *F01D 25/08* | (2006.01) | |
| *F02C 7/057* | (2006.01) | |

(52) U.S. Cl.
CPC ............. *F02C 7/057* (2013.01); *F01D 11/24* (2013.01); *F01D 21/00* (2013.01)

(58) Field of Classification Search
CPC ....... H05B 1/0272; B22O 3/036; F01D 11/24; F01D 21/003; F01D 21/12; F01D 25/08; F01D 25/10; F01D 25/145; F01D 21/00; B65D 88/744; F05D 2260/201; F05D 2260/205; F02C 7/057
See application file for complete search history.

(56) References Cited

U.S. PATENT DOCUMENTS

| | | | | | |
|---|---|---|---|---|---|
| 2,022,519 | A | * | 11/1935 | Payne | H05B 3/342 156/242 |
| 2,932,442 | A | * | 4/1960 | Hart | F01D 9/065 415/108 |
| 4,450,496 | A | * | 5/1984 | Doljack | H02H 3/08 219/212 |
| 4,482,293 | A | * | 11/1984 | Perry | F02C 7/20 415/113 |

(Continued)

FOREIGN PATENT DOCUMENTS

| | | |
|---|---|---|
| EP | 2527601 A2 | 11/2012 |
| EP | 2597274 A2 | 5/2013 |

OTHER PUBLICATIONS

European Search Report and Opinion issued in connection with corresponding EP Application No. 15169416.3 on Oct. 2, 2015.

*Primary Examiner* — Woody Lee, Jr.
*Assistant Examiner* — Joshua R Beebe
(74) *Attorney, Agent, or Firm* — Ernest G. Cusick; Hoffman Warnick LLC

(57) ABSTRACT

Various embodiments include apparatuses and systems for controlling compressor clearances. In one case, an apparatus includes: a material layer sized to fit a case of a gas turbine (GT) compressor in a GT system, the material layer including a heating element for applying heat to the case of the GT compressor; and a control system coupled with the material layer, the control system configured to: determine whether a shutdown sequence is occurring in the GT system; and actuate the heating element to apply heat to the case of the GT compressor in response to determining that the shutdown sequence is occurring.

14 Claims, 2 Drawing Sheets

(56) References Cited

U.S. PATENT DOCUMENTS

| | | | |
|---|---|---|---|
| 4,584,836 A * | 4/1986 | McClelland | F01D 25/10 |
| | | | 60/646 |
| 4,596,606 A * | 6/1986 | Kovacs | B21B 1/22 |
| | | | 148/321 |
| 4,818,439 A * | 4/1989 | Blackledge | H05B 3/56 |
| | | | 252/511 |
| 5,667,358 A | 9/1997 | Gaul | |
| 6,082,963 A | 7/2000 | Sexton et al. | |
| 6,089,821 A | 7/2000 | Maguire et al. | |
| 7,434,402 B2 | 10/2008 | Paprotna et al. | |
| 8,152,457 B2 | 4/2012 | Flanagan et al. | |
| 8,172,521 B2 | 5/2012 | Tillery et al. | |
| 8,177,474 B2 | 5/2012 | Andarawis et al. | |
| 8,186,945 B2 | 5/2012 | Bhatnagar et al. | |
| 8,210,801 B2 | 7/2012 | Ballard, Jr. et al. | |
| 2001/0013582 A1* | 8/2001 | Johnson | F01D 11/08 |
| | | | 250/559.29 |
| 2003/0066638 A1* | 4/2003 | Qu | C09K 5/14 |
| | | | 165/186 |
| 2003/0132213 A1* | 7/2003 | Kim | H01L 21/67109 |
| | | | 219/390 |
| 2007/0145041 A1* | 6/2007 | Shim | H05B 6/108 |
| | | | 219/635 |
| 2009/0044542 A1 | 2/2009 | Thatcher et al. | |
| 2009/0294435 A1* | 12/2009 | Nhan | D04H 1/42 |
| | | | 219/553 |
| 2010/0189551 A1* | 7/2010 | Ballard, Jr. | F01D 11/24 |
| | | | 415/175 |

\* cited by examiner

APPARATUS AND SYSTEM FOR COMPRESSOR CLEARANCE CONTROL

FIELD OF THE INVENTION

The subject matter disclosed herein relates to compressors. More particularly, the subject matter disclosed herein relates to apparatuses and systems for controlling compressor clearances.

BACKGROUND OF THE INVENTION

Gas turbine (GT) compressors are coupled with a GT, and provide compressed air for use in the combustion section of the GT. Compressors, in particular, gas turbine (GT) compressors, experience wide temperature fluctuations during operation. These temperature fluctuations cause thermal contraction and expansion in the compressor, particularly proximate the aft end. Frequent restarts can exacerbate this thermal distortion. In some cases, the thermal distortion on the compressor's rotor differs from distortion on the compressor's case, causing the case to interfere with the rotor (also referred to as "rubbing" or causing a "rub"). This interference can cause wear on the rotor and/or casing, contributing to numerous issues with the compressor and other components coupled with the compressor.

BRIEF DESCRIPTION OF THE INVENTION

Various embodiments include apparatuses and systems for controlling compressor clearances. In one case, an apparatus includes: a material layer sized to fit a case of a gas turbine (GT) compressor in a GT system, the material layer including a heating element for applying heat to the case of the GT compressor; and a control system coupled with the material layer, the control system configured to: determine whether a shutdown sequence is occurring in the GT system; and actuate the heating element to apply heat to the case of the GT compressor in response to determining that the shutdown sequence is occurring.

A first aspect of the invention includes an apparatus includes: a material layer sized to fit a case of a gas turbine (GT) compressor in a GT system, the material layer including a heating element for applying heat to the case of the GT compressor; and a control system coupled with the material layer, the control system configured to: determine whether a shutdown sequence is occurring in the GT system; and actuate the heating element to apply heat to the case of the GT compressor in response to determining that the shutdown sequence is occurring.

A second aspect of the invention includes: a system having: a gas turbine (GT) system including a GT compressor, the GT compressor having a case and a rotor section within the case; a material layer fitted around the case and coupled to the case, the material layer including a heating element for applying heat to the case; and a control system coupled with the material layer, the control system configured to: determine whether a shutdown sequence is occurring in the GT system; and actuate the heating element to apply heat to the case of the GT compressor in response to determining that the shutdown sequence is occurring.

A third aspect of the invention includes a system having: at least one computing device configured to: detect a shutdown sequence in a gas turbine (GT) system having a GT compressor; and provide instructions to a thermal material layer coupled with the GT compressor to apply heat to the GT compressor in response to detecting the shutdown sequence in the GT system.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
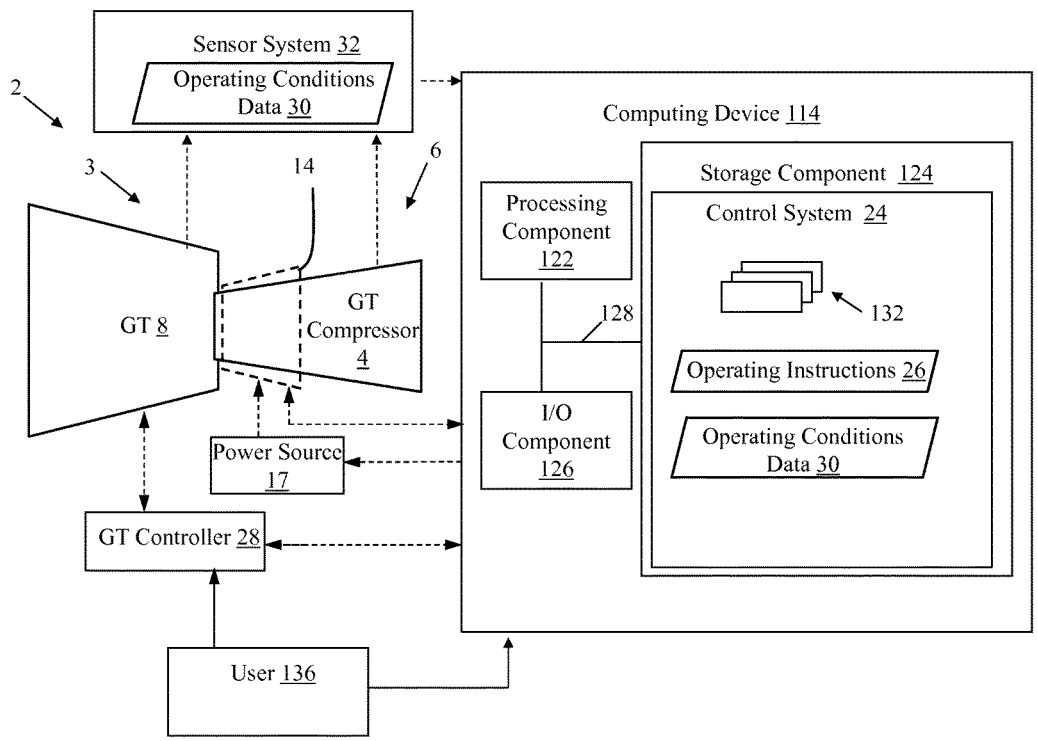
FIG. 1 shows an illustrative environment including a system and related apparatus according to various embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the subject matter disclosed herein relates to compressors. More particularly, the subject matter disclosed herein relates to apparatuses and systems for controlling compressor clearances.

Various embodiments include apparatuses, systems, and related computer program products, for controlling compressor clearances, e.g., mitigating compressor rubs. Various particular embodiments include a material layer shaped to fit a compressor, e.g., a gas turbine compressor case, the material layer including a heating element for applying heat to the compressor case. The material layer can be coupled to a control system, and can be actuated to apply heat to the case in response to predetermined operating condition of the compressor. In some cases, the material layer includes a flexible fabric. In various embodiments, the fabric is shaped and/or sized to fit a mid-section of the compressor case, in particular, a section spanning from the inlet bellmouth of the compressor to the compressor discharge case (CDC). As described herein, the material layer can be substantially thermally non-insulative, that is, nearly completely thermally conductive. This thermally non-insulative characteristic can prevent the material layer from altering the thermal properties of the compressor when it is not actuated, e.g., allowing the compressor to operate according to design specifications when the material layer is not active.

According to various embodiments, the control system can monitor the gas turbine system's operating conditions, such as operating instructions for the shutting down the gas turbine system, for an indicator of a shutdown sequence. For example, the control system can determine that the gas turbine system (and consequently, the compressor) is approaching a shutdown sequence by obtaining operating instructions instructing the gas turbine system to shutdown. In other cases, the control system can determine that the gas turbine system is approaching a shutdown sequence by monitoring other operating parameters of the gas turbine system, e.g., load, shaft speed, opening of the generator breaker etc., and determining that these operating parameters are indicative of a pending shutdown. In any case, where the control system determines that a shutdown is occurring, or likely to occur, the control system can initiate a thermal response via the material layer to mitigate rubbing in the compressor.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 2:
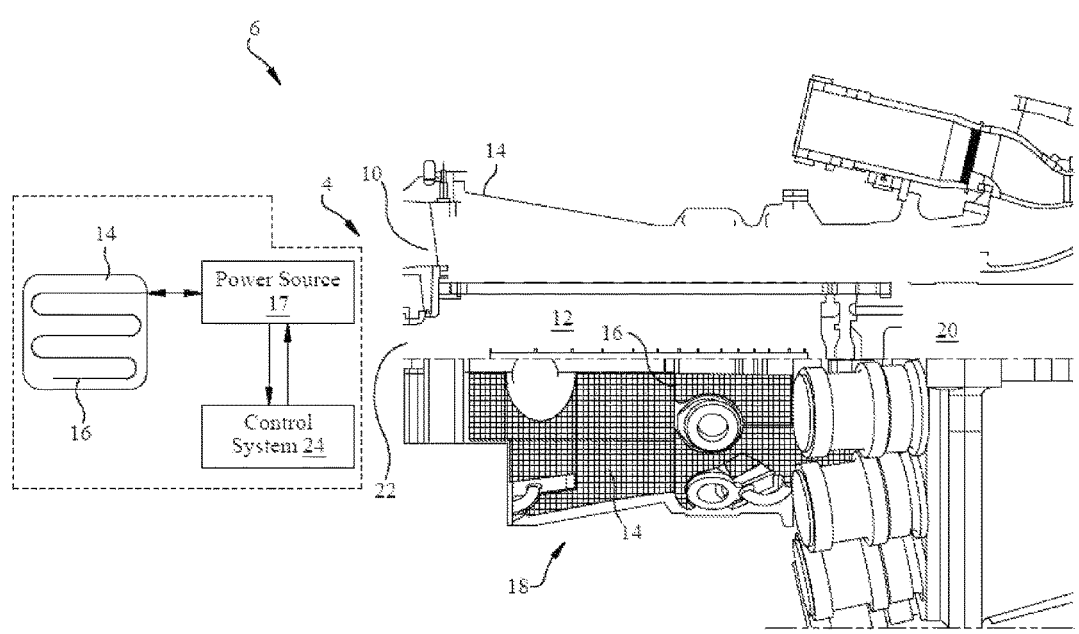
FIG. 2 shows a close-up view of a gas turbine (GT) compressor, along with the system and related apparatus of FIG. 1.

FIG. 1 shows a schematic depiction of a system 2, including a gas turbine system 3, including a gas turbine (GT) compressor 4, and an apparatus 6 coupled with the GT compressor 4. As is known in the art, the GT system 3 includes the GT compressor 4 coupled to a gas turbine (GT) 8. The GT compressor 4 is designed to provide compressed air to the GT 8 for use in the combustion cycle of that GT 8. As shown in the more detailed view of the GT compressor 4 in the schematic depiction of FIG. 2, the GT compressor 4 can include a case 10 and a rotor section 12 within the case 10. As is known in the art, the case 10 is a substantially stationary component, while the rotor section 12 rotates about a central axis to drive air through the GT compressor 4. With continuing reference to FIG. 1 and FIG. 2, the apparatus 6 can further include a material layer 14 fitted around the case 10, and coupled to the case 10.

In various embodiments, the material layer 14 can include a heating element 16 for applying heat to the case 10. In some cases, the material layer 14 can include a fabric, e.g., a semi-flexible fabric, which can be fitted over a portion of the case 10. In various embodiments, the material layer 14 can be substantially hydrophobic, that is, completely or nearly completely water repellant. In some embodiments, the material layer 14 includes a ceramic material, and may not be hydrophobic. In various embodiments, the heating element 16 can include a conductive coil, and may be coupled to a power source 17, as described further herein.

According to various embodiments, the material layer 14 can be substantially thermally non-insulative, that is, nearly completely thermally conductive. This thermally non-insulative characteristic can prevent the material layer 14 from altering the thermal properties of the GT compressor 4 when the material layer 14 not actuated, e.g., allowing the GT compressor 4 to operate according to design specifications when the material layer 14 is not actively applying heat to the casing 10 of the GT compressor 4. In some cases, the material layer 14 has a thermal (heat transfer) conductivity substantially identical to the thermal conductivity of the casing 10. In various embodiments, the casing 10 is formed of nodular cast iron, but can be formed of various other metals and/or alloys as is known in the art. As used herein, the term "substantially identical" with respect to the description of thermal conductivity of the material layer 14, indicates that the thermal conductivity of the material layer 14 is equal to the thermal conductivity of the casing 10, +/−10 percent.

In some cases, the thermal conductivity of the material layer 14 is equal to approximately 100-400 (British thermal units (BTU)*inches)/(feet$^2$(ft$^2$)*hour*degrees Fahrenheit (degF)) (or, approximately 14-58 Watts/meter*Kelvin(degrees)). In some cases, for example, where the material layer 14 includes a fabric, it may have a thermal conductivity of approximately 200 (Btu*in)/(ft$^2$*hr*degF) or greater, e.g., approximately 200-300 (Btu*in)/(ft$^2$*hr*degF) (or, approximately, 28-44 W/m*K). In other embodiments, for example, where the material layer 14 includes a ceramic, it may have a thermal conductivity below approximately 200 (Btu*in)/(ft$^2$*hr*degF).

In any case, the material layer 14 can be sized to fit around a particular portion 18 of the case 10. This particular portion 18 can span from approximately the an inlet bellmouth 20 of the case 10, to a compressor discharge case (CDC) section 22 of the case 10. In some particular examples, the material layer 14 can be sized and positioned such that extends around the aft end of the case 10.

As shown, the apparatus 6 can further include a control system 24 coupled with the material layer 14. As described herein, the control system 24 can be configured, e.g., programmed, to perform particular functions. In various embodiments, the control system 24 is configured to:

A) determine whether a shutdown sequence is occurring in the GT system 3 (including GT compressor 4); and B) actuate the heating element 16 to apply heat to the case 10 of the GT compressor 4 in response to determining that the shutdown sequence is occurring.

In some cases, the control system 24 determines that the shutdown sequence is occurring by detecting operating instructions 26 for shutting down the GT system 3 (including GT compressor 4). These operating instructions 26 can be sent to or from a GT controller 28, as is known in the art. It is understood that according to various embodiments, the control system 24 can include hardware and/or software that is integrated with the GT controller 28 (e.g., embedded as part of the programming language in GT controller 28, or sharing common hardware with the GT controller 28). In any case, the control system 24 has access to the operating instructions 26, by virtue of connection with the GT controller 28, can detect these operating instructions 26, and can perform additional functions as described herein.

In other embodiments, the control system 24 can detect one or more operating conditions (operating conditions data 30) of the GT system 3 that indicate a shutdown sequence is occurring or is likely to occur. For example, the control system 24 can detect operating conditions data 30 indicating that the shaft operating speed of the GT 8 and/or the GT compressor 4 drops below a pre-defined magnitude indicative of continuous operation, the load on the GT 8 and/or the GT compressor 4 drops below a pre-defined level indicative of continuous operation, and/or that the main generator breaker in the GT system 3 has opened. This operating conditions data 30 may be obtained by the control system 24 from one or more sensors (sensor system) 32 coupled to the GT system 3 (and/or the GT compressor 4), data logs stored in the control system 24 and/or GT controller 28, etc.

As described herein, in response to determining that the shutdown sequence (e.g., shutdown is in progress or is pending, e.g., within hours or minutes) is occurring, the control system 24 actuates the heating element 16 (FIG. 2), for example, by initiating the power source 17 (e.g., via electrical switch or controller, known in the art). Actuating the heating element 16 initiates a current flow through the heating element 16, causing the material layer 14 to heat up. Because the material layer 14 is in physical contact with the outer surface of the case 10 (consisting of conductive material such as one more metals), when actuated by current flow through the heating element 16, the material layer 14 begins to heat the case 10. Applying heat to the case 10 can mitigate a differential thermal expansion between the case 10 and the rotor section 12. That is, when a shutdown sequence is occurring, the rotor section 12 can expand due to heating of the components in that rotor section 12, to a greater extent than the case 10 that surrounds the rotor section 12 (in some cases, near the aft end of the GT compressor 4). According to various embodiments described herein, the material layer 14 can heat the case 10, causing the case 10 to expand and provide additional room for the rotor section 12 to expand without physically interfering (rubbing) with the case 10.

As described herein, the control system (CS) 24 can include any conventional control system components used in controlling a power system (including, e.g., GT compressor 4). For example, the control system 24 can include electrical and/or electro-mechanical components for actuating one or more components in the GT system 3 and/or GT compressor 4. The control system 24 can include conventional computerized sub-components such as a processor, memory, input/output, bus, etc. The control system 24 can be configured (e.g., programmed) to perform functions based upon operating conditions from an external source (e.g., at least one computing device 114), and/or may include pre-programmed (encoded) instructions based upon parameters of the GT compressor 4.

In various embodiments, the control system 24 is embodied, e.g., stored and/or operated in at least one computing device 114, which is connected with the GT system 3, including the GT compressor 4, the GT 8, the GT controller 28, and the power source 17 and material layer 14. In various embodiments, the computing device 114 is operably connected with the GT system 3 and the GT compressor 4, e.g., via the sensor system 32, which can include a plurality of conventional sensors such as flow meters, temperature sensors, etc.

The computing device 114 is shown in communication with sensor system 32, which may store operating conditions data 30 about one or more components in the GT system 3 (including the GT 8 and GT compressor 4) to computing device 114. Further, computing device 114 is shown in communication with a user 136. A user 136 may be, for example, a programmer or operator. Interactions between these components and computing device 114 are discussed elsewhere in this application.

One or more of the processes described herein can be performed, e.g., by at least one computing device, such as computing device 114, as described herein. In other cases, one or more of these processes can be performed according to a computer-implemented method. In still other embodiments, one or more of these processes can be performed by executing computer program code (e.g., control system 24) on at least one computing device (e.g., computing device 114), causing the at least one computing device to perform a process, e.g., controlling clearances in a GT compressor 4.

In further detail, computing device 114 is shown including a processing component 122 (e.g., one or more processors), a storage component 124 (e.g., a storage hierarchy), an input/output (I/O) component 126 (e.g., one or more I/O interfaces and/or devices), and a communications pathway 128. In one embodiment, processing component 122 executes program code, such as control system 24 (e.g., in particular embodiments when embodied as program code), which is, in these particular cases, at least partially embodied in storage component 124. While executing program code, processing component 122 can process data, which can result in reading and/or writing the data to/from storage component 124 and/or I/O component 126 for further processing. Pathway 128 provides a communications link between each of the components in computing device 114. I/O component 126 can comprise one or more human I/O devices or storage devices, which enable user 136, GT controller 28 and/or control system 24 to interact with computing device 114 and/or one or more communications devices to enable user 136, GT controller 28 and/or control system 24 to communicate with computing device 114 using any type of communications link. To this extent, control system 24 manage a set of interfaces (e.g., graphical user interface(s), application program interface, and/or the like) that enable human and/or system interaction with control system 24.

In any event, computing device 114 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, control system 24 can be embodied as any combination of system software and/or application software. In any event, the technical effect of computing device 114 is to control clearances in a GT compressor 4.

Further, control system 24 can be implemented using a set of modules 132. In this case, a module 132 can enable computing device 114 to perform a set of tasks used by control system 24, and can be separately developed and/or implemented apart from other portions of control system 24. Control system 24 may include modules 132 which comprise a specific use machine/hardware and/or software. Regardless, it is understood that two or more modules, and/or systems may share some/all of their respective hardware and/or software. Further, it is understood that some of the functionality discussed herein may not be implemented or additional functionality may be included as part of computing device 114.

When computing device 114 comprises multiple computing devices, each computing device may have only a portion of control system 24 embodied thereon (e.g., one or more modules 132). However, it is understood that computing device 114 and control system 24 are only representative of various possible equivalent computer systems that may perform a process described herein. To this extent, in other embodiments, the functionality provided by computing device 114 and control system 24 can be at least partially implemented by one or more computing devices that include any combination of general and/or specific purpose hardware with or without program code. In each embodiment, the hardware and program code, if included, can be created using standard engineering and programming techniques, respectively.

Regardless, when computing device 114 includes multiple computing devices, the computing devices can communicate over any type of communications link. Further, while performing a process described herein, computing device 114 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, control system 24 enables computing device 114 to control clearances in a GT compressor. Control system 24 may include logic for performing one or more actions described herein. In one embodiment, control system 24 may include logic to perform the above-stated functions. Structurally, the logic may take any of a variety of forms such as a field programmable gate array (FPGA), a microprocessor, a digital signal processor, an application specific integrated circuit (ASIC) or any other specific use machine structure capable of carrying out the functions described herein. Logic may take any of a variety of forms, such as software and/or hardware. However, for illustrative purposes, control system 24 and logic included therein will be described herein as a specific use machine. As will be understood from the description, while logic is illustrated as including each of the above-stated functions, not all of the functions are necessary according to the teachings of the invention as recited in the appended claims.

In any case, the technical effect of the various embodiments of the invention, including, e.g., the control system 24, is to control clearances in a GT compressor, e.g., GT compressor 4.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An apparatus comprising:
   a material layer sized to fit a case of a gas turbine (GT) compressor in a GT system, the material layer including a heating element for applying heat to the case of the GT compressor, wherein the material layer includes a ceramic material, the ceramic material having a thermal conductivity equal to a thermal conductivity of the case, plus-or-minus ten percent; and
   a control system coupled with the material layer, the control system configured to:
      determine whether a shutdown sequence is occurring in the GT system; and
      actuate the heating element to apply heat to the case of the GT compressor in response to determining that the shutdown sequence is occurring.

2. The apparatus of claim 1, wherein the control system determines that the shutdown sequence is occurring by detecting operating instructions for shutting down the GT system.

3. The apparatus of claim 1, wherein the heating element includes a conductive coil.

4. The apparatus of claim 1, wherein the material layer is sized to fit a portion of the case spanning from an inlet bellmouth of the case to a compressor discharge case (CDC) section.

5. The apparatus of claim 4, wherein the material layer further extends around an aft end of the case.

6. The apparatus of claim 1, wherein the material layer is shaped to mount on an outer surface of the case.

7. The apparatus of claim 1, wherein the material layer has a thermal conductivity below approximately 200 (Btu*in)/(ft$^2$*hr*degF).

8. A system comprising:
   a gas turbine (GT) system including a GT compressor, the GT compressor having a case and a rotor section within the case;
   a material layer fitted around the case and coupled to the case, the material layer including a heating element for applying heat to the case, wherein the material layer includes a ceramic material, the ceramic material having a thermal conductivity equal to a thermal conductivity of the case, plus-or-minus ten percent; and
   a control system coupled with the material layer, the control system configured to:
      determine whether a shutdown sequence is occurring in the GT system; and
      actuate the heating element to apply heat to the case of the GT compressor in response to determining that the shutdown sequence is occurring.

9. The system of claim 8, wherein the control system determines that the shutdown sequence is occurring by detecting operating instructions for shutting down the GT system.

10. The system of claim 8, wherein the heating element includes a conductive coil.

11. The system of claim 8, wherein the material layer is sized to fit a portion of the case spanning from an inlet bellmouth of the case to a compressor discharge case (CDC) section.

12. The system of claim 11, wherein the material layer further extends around an aft end of the case.

13. The system of claim 8, wherein the applying of the heat to the case mitigates a differential thermal expansion between the case and the rotor section.

14. The system of claim 8, wherein the material layer has a thermal conductivity below approximately 200 (Btu*in)/(ft$^2$*hr*degF).

* * * * *